US011972500B2

(12) United States Patent
Kona et al.

(10) Patent No.: US 11,972,500 B2
(45) Date of Patent: Apr. 30, 2024

(54) METHOD AND APPARATUS FOR INTEGRATED E-DISCOVERY

(71) Applicant: VERTICAL DISCOVERY HOLDINGS, LLC, Chicago, IL (US)

(72) Inventors: Anil Kona, Hyderabad (IN); Rajshekhar Sivaraju, Hyderabad (IN); Srinivas Sivaraju, Hyderabad (IN)

(73) Assignee: Vertical Discovery Holdings, LLC, Chicago, IL (US)

( * ) Notice: Subject to any disclaimer, the term of this patent is extended or adjusted under 35 U.S.C. 154(b) by 0 days.

(21) Appl. No.: 17/069,797

(22) Filed: Oct. 13, 2020

(65) Prior Publication Data

US 2022/0114684 A1    Apr. 14, 2022

Related U.S. Application Data

(60) Provisional application No. 62/885,939, filed on Aug. 13, 2019.

(51) Int. Cl.
*G06Q 50/18* (2012.01)
*G06F 16/93* (2019.01)
*G06F 40/186* (2020.01)

(52) U.S. Cl.
CPC .............. *G06Q 50/18* (2013.01); *G06F 16/93* (2019.01); *G06F 40/186* (2020.01)

(58) Field of Classification Search
CPC ........ G06Q 50/18; G06F 16/93; G06F 40/186
See application file for complete search history.

(56) References Cited

U.S. PATENT DOCUMENTS

| 8,090,754 B2* | 1/2012 | Schmidt | G06F 16/284 |
| | | | 707/726 |
| 8,219,974 B2* | 7/2012 | Schmidt | G06Q 50/18 |
| | | | 717/120 |
| 8,234,442 B2* | 7/2012 | Khosrowpour | G06F 16/90 |
| | | | 711/108 |
| 8,285,681 B2* | 10/2012 | Prahlad | G06F 3/0667 |
| | | | 707/640 |

(Continued)

OTHER PUBLICATIONS

Lee, Taerim et al. "A Study on Design and Implementation of E-Discovery Service based on Cloud Computing." J. Internet Serv. Inf. Secur. 2 (2012): 65-76. (Year: 2012).*

(Continued)

*Primary Examiner* — Benjamin Smith

(74) *Attorney, Agent, or Firm* — Morris, Manning & Martin, LLP; Daniel E. Sineway, Esq.; Adam J. Thompson, Esq.

(57) ABSTRACT

The system provides an integrated, end-to-end eDiscovery platform that uses artificial intelligence, robotic process automation, and machine learning. The system uses a single interface to interact with multiple electronic document sources, storage types, and communication systems. The system provides automation of a complete EDRM compliant tracking and reporting system. The system allows enterprises to use their eDiscovery software of choice, while still providing full automation. The system connects to all enterprise data, collects data using forensic tools, automates the complete processing of the data, provides automatic review, support, and hosting, and automates the production and tracking of eDiscovery.

12 Claims, 7 Drawing Sheets

(56) References Cited

U.S. PATENT DOCUMENTS

| | | | | |
|---|---|---|---|---|
| 8,396,838 B2* | 3/2013 | Brockway | G06F 16/313 | 707/662 |
| 8,635,207 B2* | 1/2014 | Marlin | G06Q 50/26 | 707/719 |
| 8,645,401 B2* | 2/2014 | Williams | G06F 16/972 | 707/765 |
| 8,707,299 B1* | 4/2014 | Bezbaruah | G06F 9/452 | 718/1 |
| 8,832,148 B2* | 9/2014 | Kisin | G06F 16/22 | 706/45 |
| 8,972,354 B1* | 3/2015 | Telang | G06Q 10/10 | 707/661 |
| 8,984,479 B2* | 3/2015 | Schmidt | G06Q 50/18 | 717/120 |
| 9,495,412 B1* | 11/2016 | Williams | G06F 16/972 | |
| 9,514,327 B2* | 12/2016 | Ford | H04L 63/02 | |
| 9,514,414 B1* | 12/2016 | Rosswog | G06N 7/005 | |
| 9,928,260 B2* | 3/2018 | Sitsky | G06F 9/505 | |
| 9,953,384 B2* | 4/2018 | Taylor | G06Q 50/18 | |
| 10,062,039 B1* | 8/2018 | Lockett | G06N 3/084 | |
| 10,242,122 B2* | 3/2019 | Rickey | G06F 8/60 | |
| 10,346,937 B2* | 7/2019 | Ford | G06Q 10/103 | |
| 10,650,476 B2* | 5/2020 | Bässler | G06Q 50/18 | |
| 10,826,930 B2* | 11/2020 | Sitsky | H04L 63/1416 | |
| 11,030,170 B2* | 6/2021 | Sitsky | G06F 9/505 | |
| 11,062,409 B2* | 7/2021 | Ross | G06F 16/958 | |
| 11,140,212 B2* | 10/2021 | Balthaser | H04L 12/4633 | |
| 11,190,574 B2* | 11/2021 | Balthaser | H04L 41/0886 | |
| 11,500,729 B2* | 11/2022 | Tkachev | G06F 21/64 | |
| 2009/0150168 A1* | 6/2009 | Schmidt | G06Q 10/10 | 705/311 |
| 2009/0150431 A1* | 6/2009 | Schmidt | G06F 16/284 | |
| 2009/0150866 A1* | 6/2009 | Schmidt | G06Q 50/18 | 717/120 |
| 2009/0150906 A1* | 6/2009 | Schmidt | G06Q 50/18 | 719/317 |
| 2010/0205020 A1* | 8/2010 | Losey | G06Q 20/20 | 705/16 |
| 2010/0332818 A1* | 12/2010 | Prahlad | H04L 67/1095 | 709/217 |
| 2010/0333116 A1* | 12/2010 | Prahlad | G06F 3/0649 | 713/153 |
| 2011/0040748 A1* | 2/2011 | Williams | G06F 16/972 | 707/E17.014 |
| 2011/0093471 A1* | 4/2011 | Brockway | G06F 16/313 | 707/747 |
| 2011/0184935 A1* | 7/2011 | Marlin | G06Q 50/10 | 707/719 |
| 2011/0258375 A1* | 10/2011 | Khosrowpour | G06F 16/90 | 711/108 |
| 2011/0320480 A1* | 12/2011 | Kisin | G06F 17/00 | 707/769 |
| 2012/0246130 A1* | 9/2012 | Schmidt | G06Q 90/00 | 707/694 |
| 2012/0254134 A1* | 10/2012 | Talati | G06F 16/93 | 707/E17.008 |
| 2013/0080342 A1* | 3/2013 | Talati | G06F 16/94 | 707/741 |
| 2013/0117218 A1* | 5/2013 | Fan | G06F 16/951 | 707/603 |
| 2013/0231971 A1* | 9/2013 | Bishop | G06Q 10/063114 | 705/7.15 |
| 2013/0339075 A1* | 12/2013 | Kisin | G06Q 10/10 | 705/7.13 |
| 2013/0339258 A1* | 12/2013 | Kisin | G06Q 10/10 | 705/311 |
| 2014/0081984 A1* | 3/2014 | Sitsky | G06F 16/31 | 707/741 |
| 2014/0278663 A1* | 9/2014 | Samuel | G06Q 10/0633 | 705/7.17 |
| 2014/0279588 A1* | 9/2014 | FitzGerald | G06Q 10/00 | 705/311 |
| 2015/0135300 A1* | 5/2015 | Ford | H04L 63/0281 | 726/11 |
| 2016/0028761 A1* | 1/2016 | Sitsky | H04L 63/1416 | 726/23 |
| 2016/0321767 A1* | 11/2016 | Taylor | G06F 16/22 | |
| 2016/0330132 A1* | 11/2016 | Rickey | G06Q 10/06 | |
| 2017/0041296 A1* | 2/2017 | Ford | G06F 16/951 | |
| 2017/0046807 A1* | 2/2017 | Ford | G06Q 10/103 | |
| 2018/0349421 A1* | 12/2018 | Sitsky | G06F 16/31 | |
| 2019/0164241 A1* | 5/2019 | Bässler | G06Q 50/18 | |
| 2020/0042530 A1* | 2/2020 | Ross | G06Q 50/18 | |
| 2020/0242710 A1* | 7/2020 | Krovvidi | G06F 16/93 | |
| 2020/0244720 A1* | 7/2020 | Balthaser | G06F 9/45558 | |
| 2020/0310917 A1* | 10/2020 | Tkachev | G06F 11/1451 | |
| 2021/0058425 A1* | 2/2021 | Sitsky | G06F 21/562 | |
| 2021/0286788 A1* | 9/2021 | Sitsky | G06F 16/31 | |
| 2021/0350483 A1* | 11/2021 | Ross | G06Q 50/18 | |
| 2022/0083685 A1* | 3/2022 | Reyes | G06F 21/6245 | |

OTHER PUBLICATIONS

Gregory L Fordham, "Eleven Steps to Designing an E-Discovery Plan and Protocol: A Systems Engineering Approach to Modern Litigation", 2015, 34 pages, https://www.fordhamforensics.com/publications/design-ediscovery-protocol.html, Archived on the WayBack Machine on Mar. 6, 2019, (Year: 2015).*

Lee, T. R., Kim, H., Rhee, K. H., & Shin, S. U. (2013). Design and implementation of e-discovery as a service based on cloud computing. Computer Science and Information Systems, 10(2), 703-724. https://doi.org/10.2298/csis1209220301 (Year: 2013).*

International Preliminary Report on Patentability for International Application No. PCT/US2020/055435, dated Feb. 24, 2022, 6 Pages.

International Search Report and Written Opinion for International Application No. PCT/US2020/055435, dated Jan. 22, 2021, 7 Pages.

Lee., et al., "Design and Implementation of E-Discovery as a Service Based on Cloud Computing," (20130400), Dec. 29, 2020, XP055793975, Retrieved from URL: http://www.doiserbia.nb.rs/img/doi/1820-0214/2013/1820-02141300030L.pdf.

* cited by examiner

METHOD AND APPARATUS FOR INTEGRATED E-DISCOVERY

This patent application claims priority to U.S. Provisional Patent Application 62/885,939 filed on Aug. 13, 2019, which is incorporated by reference herein in its entirety.

BACKGROUND OF THE SYSTEM

Judicial discovery, the collection and exchange of evidence in a dispute, has traditionally involved physical documents, identification of witnesses, physical evidence, and the like. With the advent of digital data, a category of judicial discovery known as electronic discovery or "eDiscovery" has evolved. eDiscovery seeks information stored in electronic format, whether on disk drives, removable media, jump drives, cloud storage, and the like. Unlike physical evidence, electronic documents include additional information, called "meta-data" that identifies some of the life cycle of the documents (e.g. date of creation, date(s) of modification, version, Author, dates last read, and the like). The meta-data can be as important as the electronic document itself in some cases.

eDiscovery typically includes multiple steps, such as identification, preservation, collection, processing, hosting, review, and production of the electronic data. These steps currently require a large amount of human interaction. The Electronic Discovery Reference Model (EDRM) is a framework that outlines standards for recovery and discovery of electronic documents and data. EDRM is not an application, but rather it provides guidance and protocols for eDiscovery standards, including identification, preservation, collection, processing, review, analysis, production, and presentation.

eDiscovery has a number of inherent challenges because of the operational mechanics of the process itself. It is a fragmented, labour-intensive process that requires multiple steps (each requiring its own applications) and highly specialized technical professionals. Knowledge of highly technical digital forensic discrete applications is required to perform each phase of eDiscovery, e.g. collection, processing, hosting, etc. Manual workarounds must be built to "connect" each application.

Digital information and electronic documents come from a plurality of sources and enterprise data management applications, such as word processing programs, accounting programs, spreadsheets, email systems, messaging and text systems, social media accounts, digital audio and video recording, cloud storage, and the like. eDiscovery must be able to access data from many sources and collect the data, store it so it is not tampered with or modified, and make it accessible for the procedure for which it was sought.

A danger in eDiscovery is being over-inclusive or under-inclusive. The desire is to only provide and produce what is legally required, no more, no less. There are many applications that manage data subject to discovery, such as email programs, spreadsheet programs, word processing, contact management, and the like. Although these programs have export capabilities, such applications are not particularly well suited for eDiscovery procedures. Therefore, specialized applications have been created to interface with each type of data source to help optimize data collection.

In the current art, there are one or two software providers who developed a single platform to attend to end-to-end eDiscovery process. However, these solutions are limited because they require the use of their own proprietary tools. The current systems don't have full-fledged integration with the leading eDiscovery software providers. Also, they are limited to the options they offer, which is either on-premises or cloud. They also lack important features that are required for an effective eDiscovery process.

SUMMARY

The system provides an integrated, end-to-end eDiscovery platform that uses artificial intelligence, robotic process automation, and machine learning. The system uses a single interface to interact with multiple electronic document sources, storage types, and communication systems. The system provides automation of a complete EDRM compliant tracking and reporting system. The system allows enterprises to use their eDiscovery software of choice, while still providing full automation. The system connects to all enterprise data, collects data using forensic tools, automates the complete processing of the data, provides automatic review, support, and hosting, and automates the production and tracking of eDiscovery.

DETAILED DESCRIPTION OF THE SYSTEM

The system provides automation software to integrate with existing enterprise applications and leading eDiscovery software applications. The system may be on-premises, a hybrid of on-premise and cloud based, or fully cloud based.

The system provides a revolutionary robotic automation of a complete EDRM and information tracking and reporting system. The system provides flexibility and robotic automation before and after the EDRM stages. The system provides a complete automation to the end users to manage their litigation portfolio.

Figure 1:
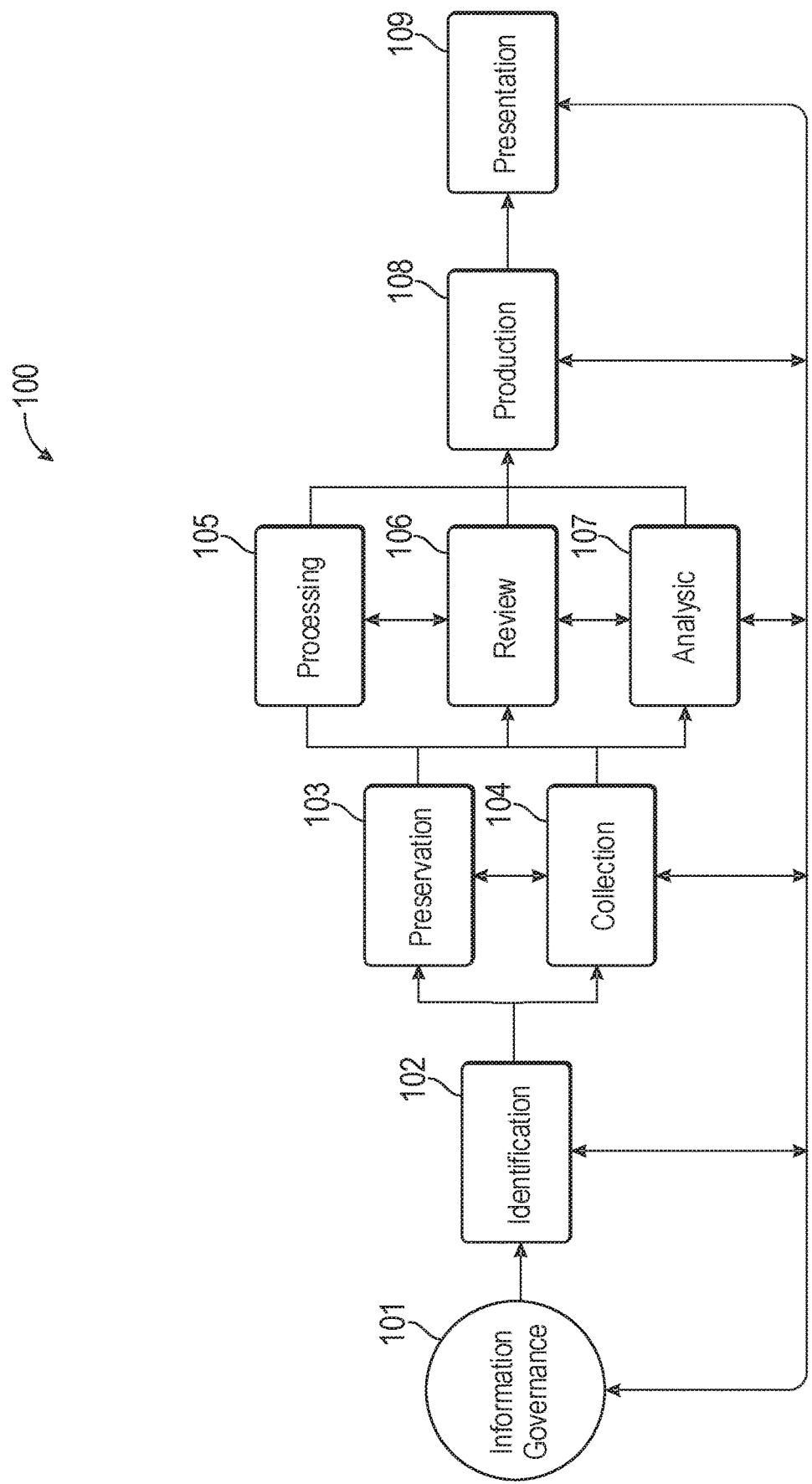
FIG. 1 illustrates the EDRM reference model.

The EDRM model is illustrated in FIG. 1. The EDRM model 100 is comprised of nine stages which define eDiscovery activities during an investigation. Stage 100 is Information Governance and represents the management of data through enterprise policies, procedures, processes, and the like. Stage 102 is Identification and represents those activities that assist in identifying electronically stored information (ESI) that might be relevant to an investigation. The Identification stage 102 might be over-inclusive with editing and modification effected in other stages.

Stage 103 is Preservation and represents the control of ESI to prevent loss, modification, deletion, tampering, or other activities that could lead to spoliation of the ESI. This stage preserves the data in the state that is required to satisfy the parameters of the investigation. It is sometimes referred to as a "legal hold". Stage 104 is Collection and represents the gathering of the ESI in a manner that preserves the authenticity of the ESI.

Processing stage 105 is the cleaning of ESI to remove irrelevant data and to convert files and store the file in a location for future use. Stage 106 is Review and represents the analysis of the ESI by legal personnel to determine if the data for how it relates to the investigation (or if it in fact does relate to the investigation). During the Review stage 106, some ESI may be deleted if it is not responsive or necessary to produce.

The Analysis stage 107 is the evaluation of the ESI for use with respect to the investigation. This may be as simple as identifying what request the ESI might be responsive to, or the importance or ranking of ESI as appropriate.

Production at stage 108 is the determination of providing the ESI in a way that ensures its reliability and integrity in a defensible manner. Presentation stage 109 is the stage of determining the best way to present the ESI (such as at trial) via paper, digital presentation, and the like.

The system is an integrated intelligent eDiscovery automation application that combines template driven workflow, end-to-end automation, and technology collaboration to accomplish the goal of streamlining EDRM functions in a single intelligent application. In one embodiment, the system uses robots to accomplish some of the automation of the application.

Figure 2:
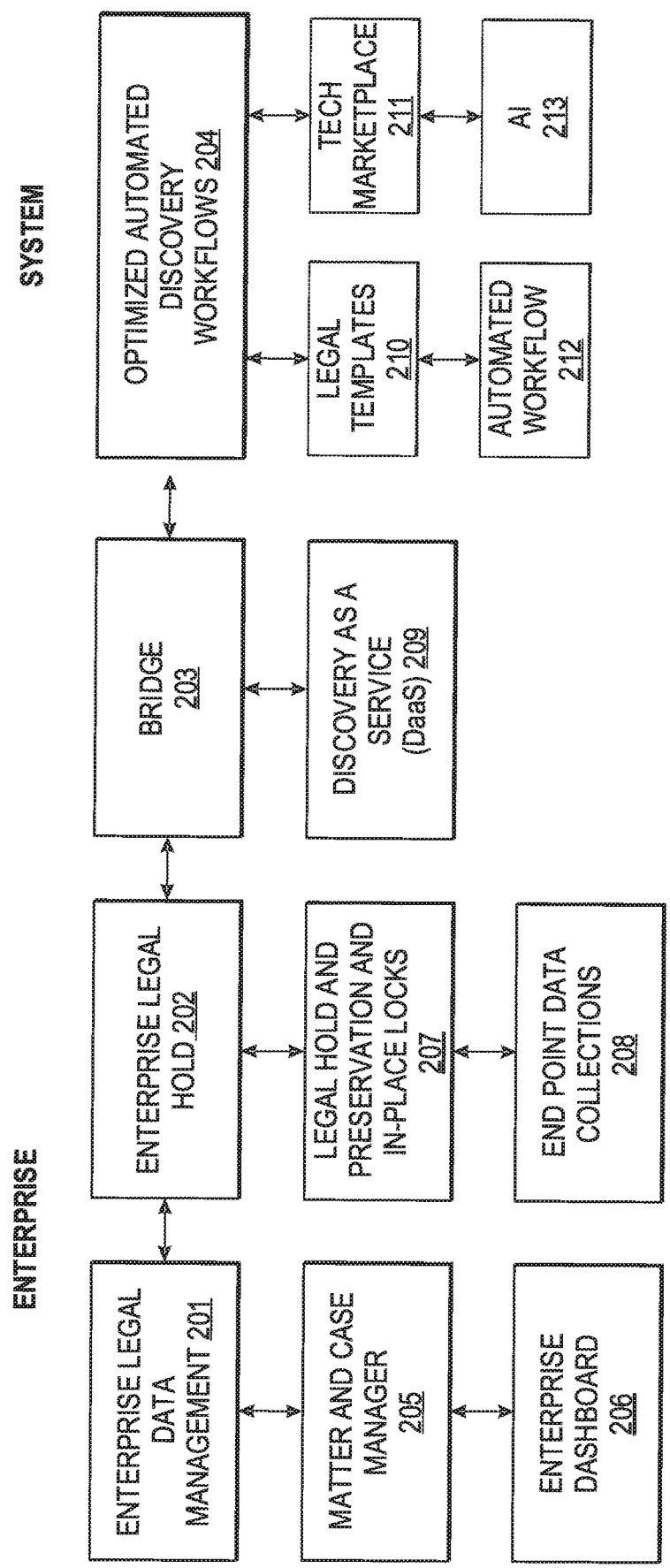
FIG. 2 illustrates a block diagram of an embodiment of the system.

FIG. 2 is a block diagram of the system in an embodiment. Functions at the Enterprise level can communicate with the System via Bridge 203. The Enterprise includes applications for Enterprise legal data management 201 and Enterprise legal hold 202. Enterprise legal data management includes a matter and case manager module 205 and Enterprise dashboard 206. Matter and case manager 205 streamlines day to day case activities for the enterprise. Manager 205 allows a user to pull or enter case information such as scope of the case, type of matter, jurisdiction, internal/external counsel, and key facts or documents. The Manager 205 can analyze HR data to select custodians or targets of ESI requests, select relevant data sources from across the entire enterprise, and route the case for approval and ensure separation of duties.

Enterprise dashboard 206 allows a user to track the status of a case visually at high or detailed level. Legal and forensic teams have instant visibility into critical metrics in real-time. A user can review a global portfolio of risks across business entities, departments, matter types and counsel; drill into case detail for immediate access to custodian ESI and collection status; and understand metrics around collected file sizes, number of documents, and volume. The dashboard can provide a single view for tracking activities from initiation through file preservation/hold confirmation.

Enterprise legal hold 202 implements the legal hold and preservation module 207 and end point data collections module 208. Module 207 provides in-place locks for ESI and preserves the data to the standard of a legal hold. A user of module 207 can send legal holds, notifications and questionnaires, track acknowledgments, escalations, and enforcements in real-time, and leverage and reuse customizable templates with multi-lingual support. An authorized user can revoke legal holds, conduct custodian interviews, run preservations, and set up reminders and escalations.

The Preservation operation implements rules that may be ordered in the underlying cause of action for which eDiscovery is taking place. In one embodiment, this automated Preservation operation is accomplished through an interactive dashboard that provides queries to a user and, based on response to those queries, automatically generates hold and preservation rules that apply to the electronically stored information (ESI). The Preservation operation can be implemented using legacy applications such as Exchange, Office 365, SharePoint, mail programs, and the like.

The Legal Hold operation at the Client on-premise location is implemented via the system. The Matter Manager operation can be integrated with existing software such as Workday, ServiceNow, Active Directory, SuccessFactors, and the like to integrate preservation and collection.

Module 207 provides custodian management to allow shared updates with stakeholders, place legal hold notices in stealth mode for sensitive investigations, manage non-custodial legal holds, and include custodian interviews and stored disclosed documents.

Module 207 can automate in-place preservations and suspend record retention policies directly, all with a single click. A user can preserve and hold custodian data with in-place holds, confirm successful data preservations with real-time data integrity checks, integrate more than 42 types of enterprise and cloud data sources, and handle sensitive investigations through controlled communication. Module 207 includes APIs to interface with data sources such as Office, Office 365, OneDrive, Google Drive, Gmail, Outlook, Slack, and the like. The module 207 uses a robot to provide interaction with the various apps.

Module 208 provides automated data collection. A user can use module d208 to set the scope of ESI collections and execute forensics remotely. The user can also integrate enterprise and cloud data and manage ESI with built-in chain of custody, enable legal teams of all forensic capabilities to perform powerful collections with a few clicks, run targeted collections (custodian/date/terms) or full disk images, in a defensible manner, and utilize 40+ standard APIs and connect directly to enterprise data stores.

The Enterprise side communicates with the System side via Bridge 203. Bridge 203 allows a user to implement the project handover process with a secure connection between on-premises applications and service partner's cloud-based eDiscovery applications. Bridge 203 allows a user to manage and track an eDiscovery and litigation portfolio in real-time, from anywhere, to manage projects internally or with service partner, to seamlessly switch between in-house and outsourced eDiscovery, and to securely transfer data between corporations and service partners. The Bridge 203 provides Discovery as a Service (DaaS) 209 functionality.

The system allows an enterprise to have employees handle the eDiscovery using the system and staying behind the firewall of the company, reducing data risk. In one embodiment, a third-party vendor can use the system to connect into the platform behind the enterprise firewall and perform the eDiscovery, again keeping the data more secure behind the enterprise firewall. In one embodiment, the data can be transmitted outside the firewall to a third party for eDiscovery operations.

At the System side, module 204 provides optimized and automated eDiscovery workflows. This provides, in an embodiment, Legal Templates 210, Automated Workflow 212, Tech Marketplace 211, and Artificial Intelligence (AI) 213. Module 204 provides API integration with eDiscovery applications including, but not limited to, Nuix (and Nuix Discover and Workstation), Relativity, One, EnCase, and the like.

The Legal Templates module 210 allows a user to automatically combine all eDiscovery steps including workspace configurations, security, data upload, batching (amongst many others), into a single template, eliminating repetitive, manual, and error-prone steps. The user can configure matter-specific templates for DOJ, SEC, and internal investigations, reuse templates across matters, separate templates for workflow and other configurations, and retain the flexibility to intervene and change settings retrospectively When using the Automated Workflow Module 212, templates from module 210 trigger intelligent automation, running each batch of evidence through a consistent process through to production This module allows complete streamlining of EDRM with unparalleled visibility, one-click automation from pre-collection to review Automated quality assurance checks, restarts, and exception handling, and reduction in manual task handling by more than 70%.

The Tech Marketplace module 211 provides API integration with eDiscovery applications including, but not limited to, Nuix (and Nuix Discover and Workstation), Relativity, One, EnCase, and the like. The AI module 213 provides quality control, notifications, exception handling, and audits.

In one embodiment, the AI 213 can provide improvements in data collection and processing. In some cases, a data collection and/or processing task could be performed in a plurality of ways. The AI 213 can analyze parameters and determine the best way to proceed. Robotic process automation ("RPA") can also be used as part of this analysis. Another area where AI is used is outcome predicting. The system has access to a large number of past cases of eDiscovery. The system can identify prior cases where tasks were similar and suggest appropriate processes to increase the chances of a desired outcome. The AI can also provide statistics on possible outcomes.

Figure 3:
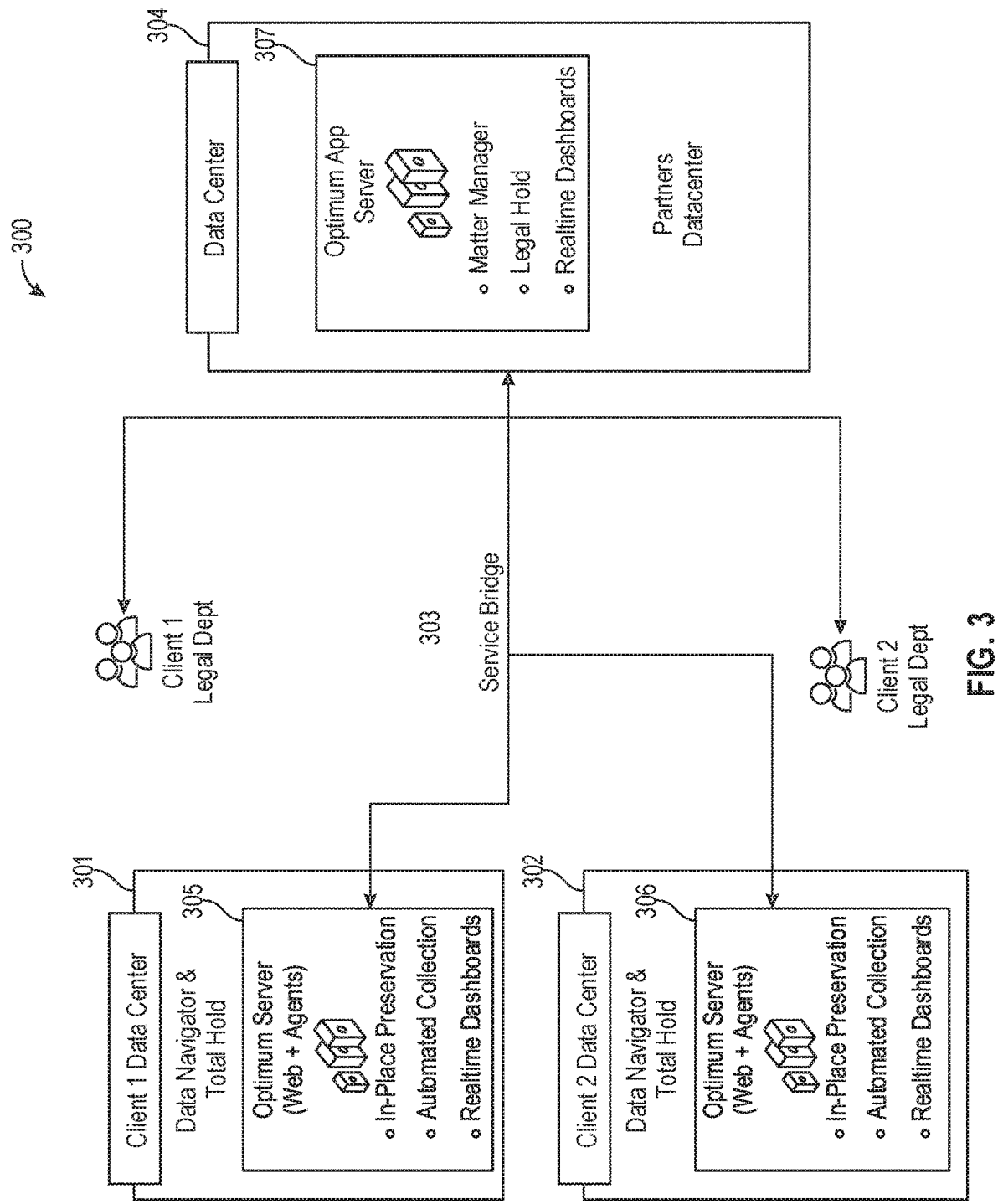
FIG. 3 illustrates the system providing DaaS.

FIG. 3 illustrates the system providing DaaS. The system 300 shows Client 1 Data Center 301 and Client 2 Data Center 302. These Data Centers communicate via Service Bridge 303 to System Data Center 304.

System Data Center 304 includes App Server 307 which serves Enterprise Legal Data management (module 201 from FIG. 2, along with modules 205 and 206) and Enterprise Legal Hold (module 202 from FIG. 2 along with modules 207 and 208).

Client 1 Data Center 301 includes a System Server 305 and Client 2 Data Center 302 includes System Server 306. The System Servers access modules 201 and 202 on the System Server 304 via Bridge 303. This allows the Clients to access the features of the system through DaaS instead of local apps. In this embodiment, data collected at each client will be uploaded automatically to the System Server 304 via the Bridge 303. Service providers will have more granular visibility of projects and how much data is being uploaded upfront for better management of resources. Clients will have real-time dashboards and reporting, reducing lot of project management hassles. Clients will have the similar visibility on the status and stats on real time. Client 1 legal department and Client 2 legal department can access ESI through the system. Although only two clients are shown in FIG. 3, the system can be implemented with any desired number of clients.

Identification and Collection 101 includes operations 105, such as Collection, In-Place Preservation, Legal Hold, and Matter Manager. Processing, Hosting, and Production 102 includes operations 106 such as Processing, Hosting and Review, and Production. This can be implemented in a data center if desired.

Visualizations

Figure 4:
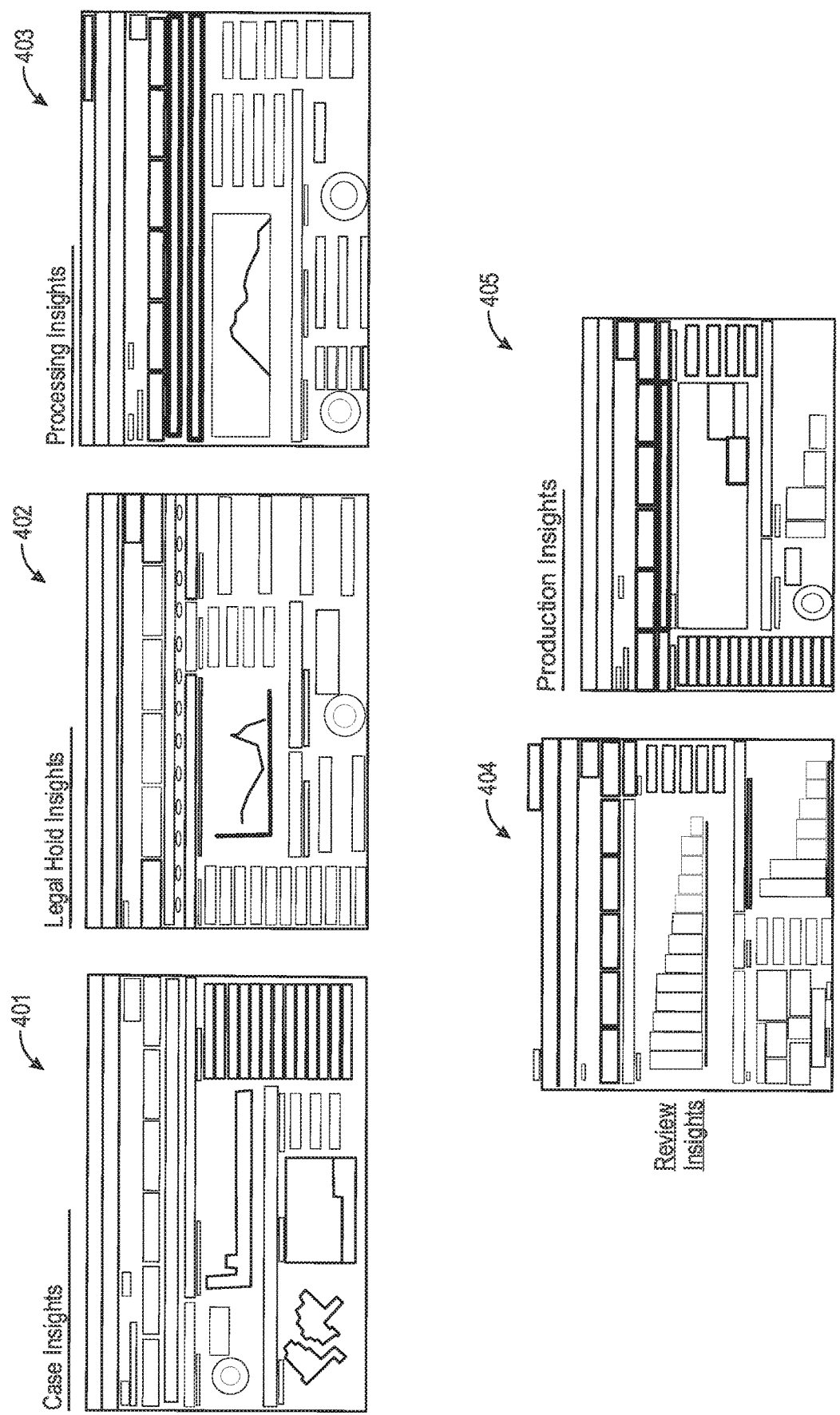
FIG. 4 illustrates examples of visualizations in an embodiment.

Presentation and Visualizations allow data, meta-data, and other information to be presented to a user to improve use, impact, and understanding. FIG. 4 illustrates visualizations for Case Insights 401, Legal Hold Insights 402, Processing Insights 403, Review Insights 404, and Production Insights 405. These are shown by way of example and are not exhaustive of the capabilities of the system.

Architecture

Figure 5:
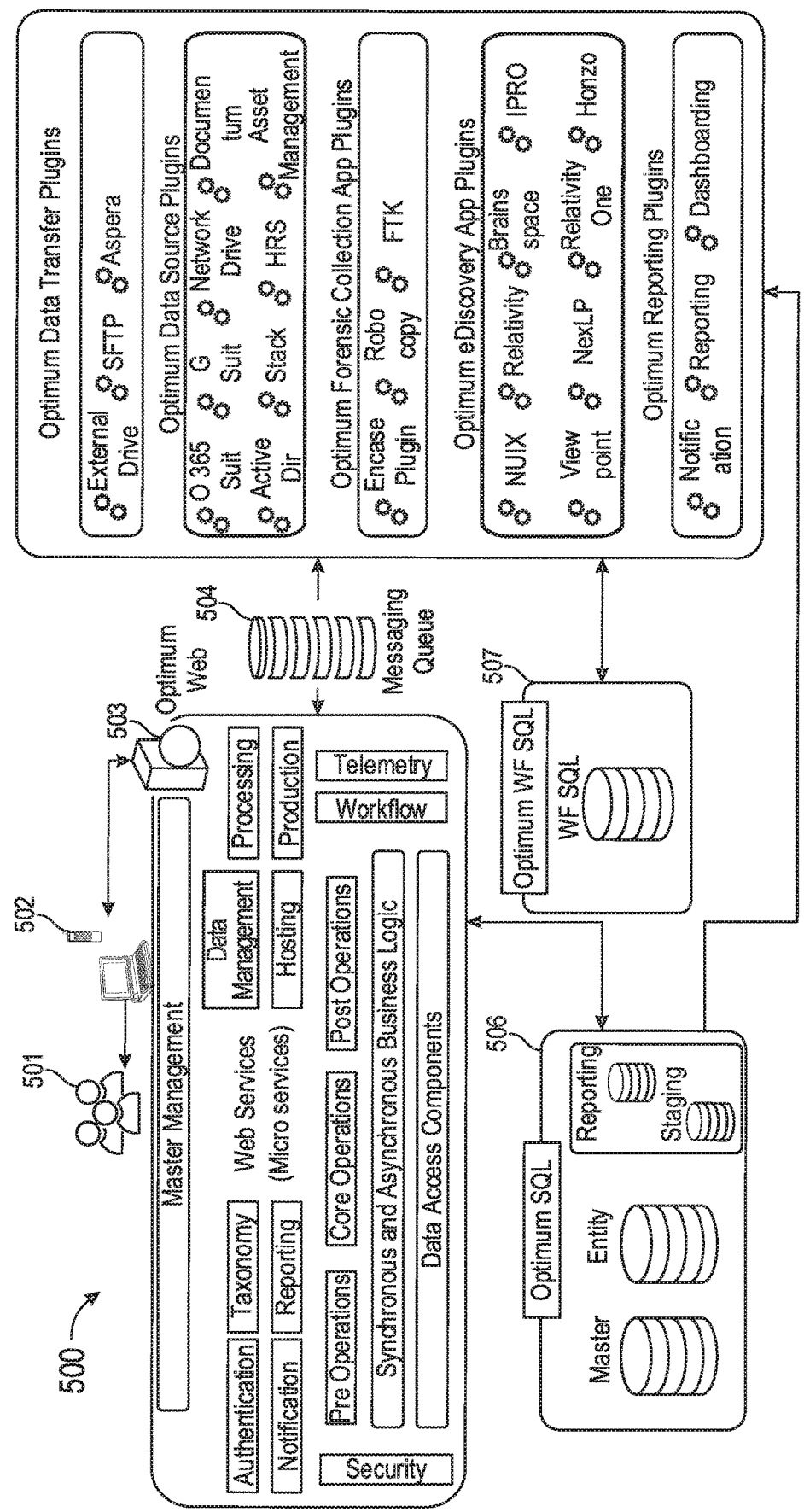
FIG. 5 illustrates the architecture of the system in an embodiment.

FIG. 5 illustrates the architecture 500 of the system in an embodiment. User(s) 501 use processing devices 502 (i.e. computer, pad, mobile device, laptop, and the like) to communicate to a system server 503. The System server 503 provides Matter Management, Web Services, Security, Telemetery, Workflow, Pre-Operations, Core Operations, Post Operations, Synchronous and Asynchronous Business Logic, and Data Access and Components. The Server 503 may be implemented in a stand-alone device, in a browser environment, in the cloud, or any suitable implementation.

The system includes an SQL database 506 that provides storage as needed. The Server 503 communicates through a messaging queue 504 to data transfer plugins 505 which perform data transfer, data source, forensic collection, eDiscovery operations, and reporting. The system utilizes robots to perform the operations of the plugins and other features of the system.

Communication

Figure 6:
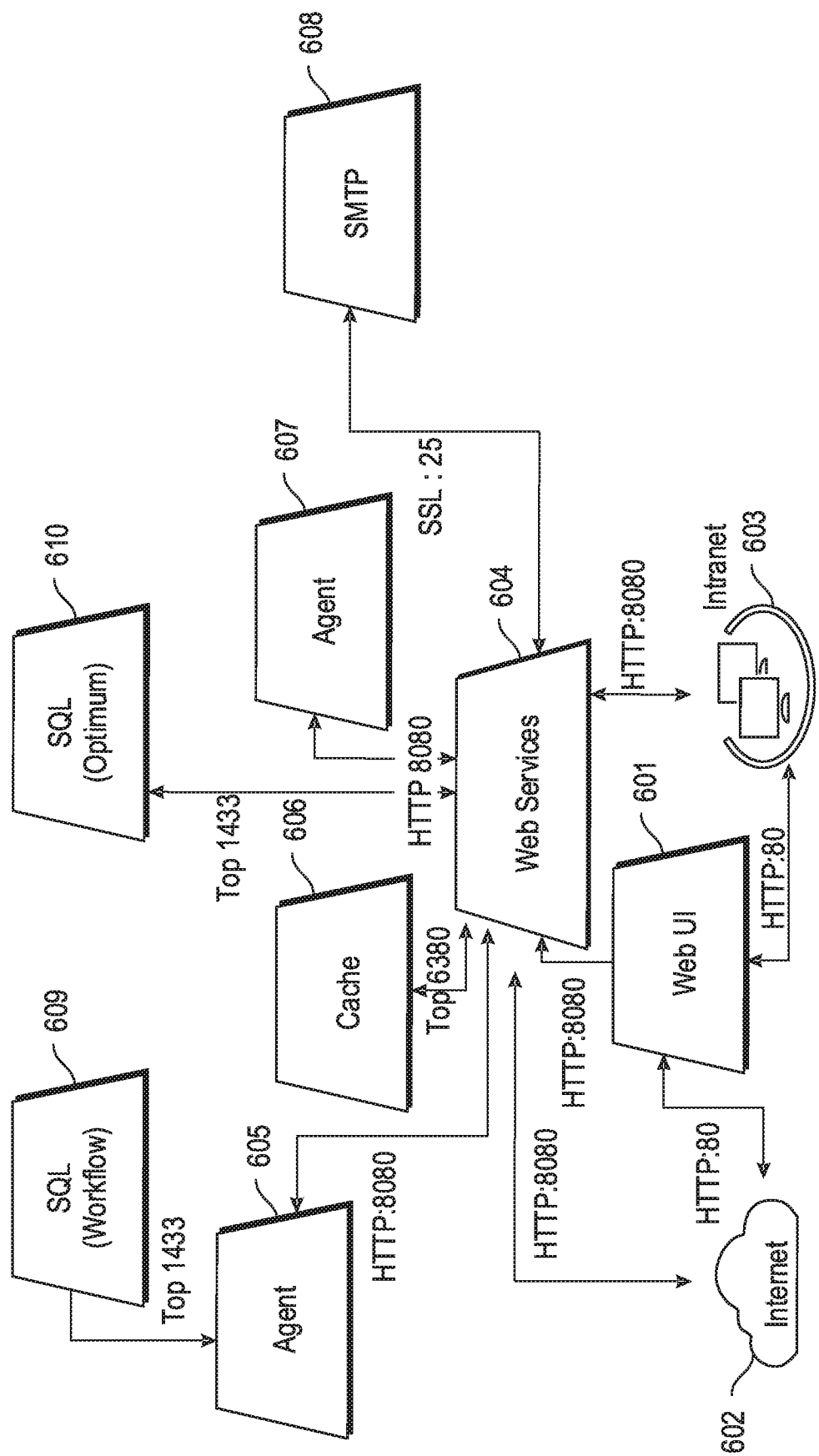
FIG. 6 illustrates communication in the system in an embodiment.

FIG. 6 illustrates the communication layer 600 of the system in an embodiment. A Web UI 601 communicates via Internet 602 and client intranet 603 and access the System Web Services 604. Web Services 604 communicates with one or more Agents such as Agent 605 or Agent 607 to perform certain functions or to interface with certain apps (e.g. Office 365, Outlook, and the like). The Agents are also referred to as robots in this example. This level includes Cache 606 and SMTP module 608. Data and information are stored in system SQL databases 609 or 610.

Example Implementation

Figure 7:
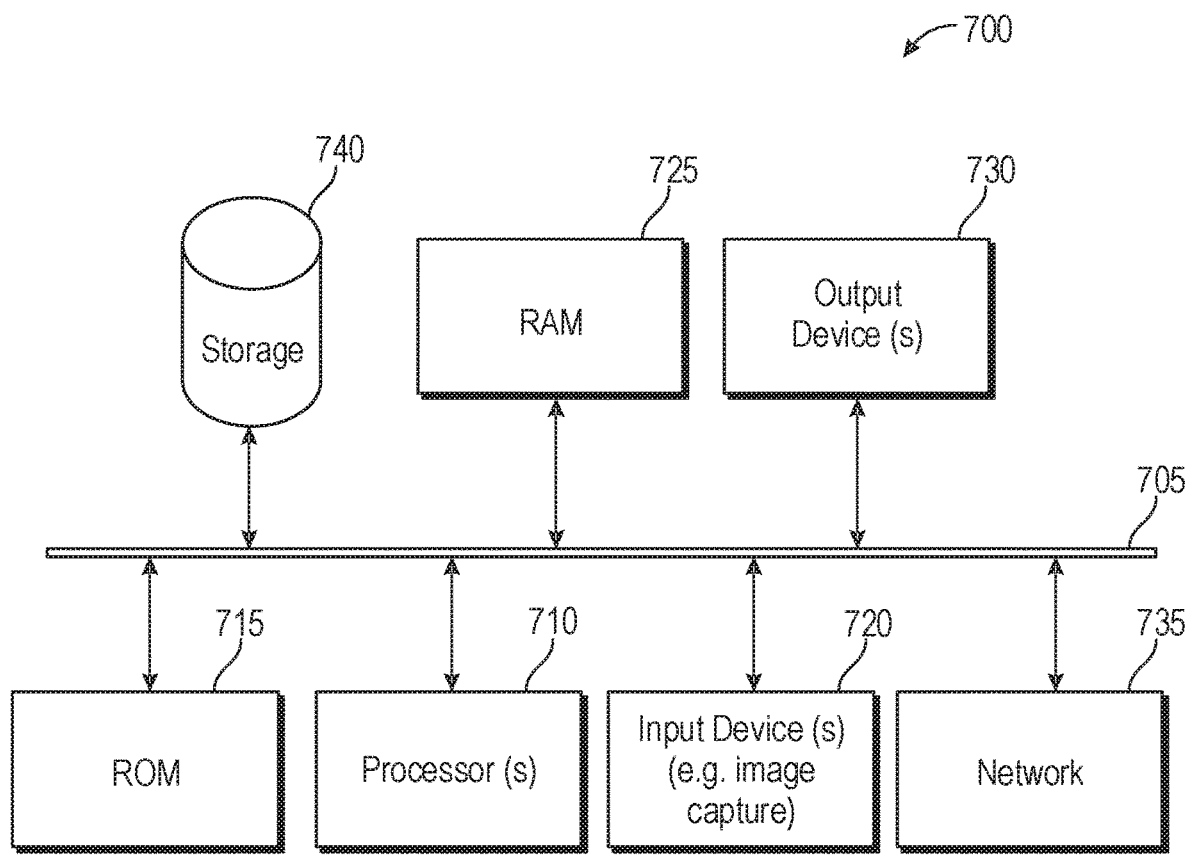
FIG. 7 illustrates an example computer environment.

FIG. 7 illustrates an exemplary a system 700 that may implement the system. The electronic system 700 of some embodiments may be a mobile apparatus. The electronic system includes various types of machine-readable media and interfaces. The electronic system includes a bus 705, processor(s) 710, read only memory (ROM) 715, input device(s) 720, random access memory (RAM) 725, output device(s) 730, a network component 735, and a permanent storage device 740.

The bus 705 communicatively connects the internal devices and/or components of the electronic system. For instance, the bus 705 communicatively connects the processor(s) 710 with the ROM 715, the RAM 725, and the permanent storage 740. The processor(s) 710 retrieve instructions from the memory units to execute processes of the invention.

The processor(s) 710 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine-readable storage medium (also referred to as machine readable medium). When these instructions are executed by one or more of the processor(s) 710, they cause the processor(s) 710 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 710. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 700, define one or more specific machine implementations that execute and perform the operations of the software programs.

The ROM 715 stores static instructions needed by the processor(s) 710 and other components of the electronic system. The ROM may store the instructions necessary for the processor(s) 710 to execute the processes provided by the system. The permanent storage 740 is a non-volatile memory that stores instructions and data when the electronic system 700 is on or off. The permanent storage 740 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 725 is a volatile read/write memory. The RAM 725 stores instructions needed by the processor(s) 710 at runtime, the RAM 725 may also store the real-time video or still images acquired by the system. The bus 705 also connects input and output devices 720 and 730. The input devices enable the user to communicate information and select commands to the electronic system. The input devices 720 may be a keypad, image capture apparatus, or a touch screen display capable of receiving touch interactions. The output device(s) 730 display images generated by the electronic system. The output devices may include printers or display devices such as monitors.

The bus 705 also couples the electronic system to a network 735. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

What is claimed is:

1. An eDiscovery system comprising:
   an enterprise system, comprising a first processor and first memory device, having a plurality of data sources storing data subject to eDiscovery requests and implementing Electronic Discovery Reference Model (EDRM) standards of eDiscovery and including:
   a data collection module, comprising the first processor and the first memory device, wherein the first processor is configured to perform automated data collection by setting a scope of data to be collected and use a plurality of APIs to interface with the plurality of data sources;
   legal hold and preservation module, comprising the first processor and the first memory device, wherein the first processor is configured to:
   generate a query;
   receive a response to the query;
   in response to receiving the query, generate hold and preservation rules;
   provide in-place locks in real time for data in the plurality of data sources pursuant to a legal hold request and based in least in part on the hold and preservation rules; and
   confirm successful preservation of the data with real time data integrity checks;

matter management module, comprising the first processor and the first memory device, wherein the first processor is configured to automatically identify data custodians and relevant data sources based on case information provided to the matter management module and define the scope of data collected by the data collection module;

enterprise legal hold module comprising the legal hold and preservation module and the data collection module, and enterprise legal management module comprising the matter management module and an enterprise dashboard;

a discovery system comprising a second processor, a second memory device and:

an automated discovery workflow module, comprising the second processor and the second memory device, wherein the second processor is configured to provide API integration with a plurality of eDiscovery applications;

legal template module, comprising the second processor and the second memory device, wherein the second processor is configured to automatically include all eDiscovery steps into a single template;

an automated workflow module, comprising the second processor and the second memory device, wherein the second processor is configured to provide automation when running a batch of evidence; and analyze eDiscovery requests and automatically determining an optimized process from a plurality of processes for collecting data responsive to eDiscovery requests, wherein determining the optimized process is based on historical data of similar cases; and a bridge, comprising a third processor and a third memory device, wherein the third processor is configured to provide discovery as a service (DaaS) functionality and communicate with the enterprise system.

2. The system of claim 1 wherein the data collection is performed by the enterprise system.

3. The system of claim 1 wherein data subject to eDiscovery is transferred from the enterprise system to the discovery system.

4. The system of claim 1 wherein the single template triggers the automated workflow module.

5. The system of claim 1 wherein the in-place locks preserves the data to a standard of a legal hold.

6. The system of claim 1, wherein the enterprise system is behind a firewall and the bridge is configured to pass the data between the enterprise system and the discovery system.

7. An eDiscovery method comprising:

storing, via an enterprise system comprising a first processor and a first memory device, data subject to eDiscovery requests on a plurality of data sources, wherein the enterprise system implements Electronic Discovery Reference Model (EDRM) standards of eDiscovery;

performing, via the first processor, automated data collection by setting a scope of data to be collected and use a plurality of APIs to interface with the plurality of data sources, wherein a data collection module comprises the first processor and the first memory device;

using, via the first processor and the first memory device, a plurality of APIs to interface with the plurality of data sources;

generating, via the first processor, a query, wherein a legal hold and preservation module comprises the first processor and the first memory device;

receiving, via the first processor, a response to the query;

in response to receiving the query, generating, via the first processor, hold and preservation rules;

providing, via the first processor, in-place locks in real time for data in the plurality of data sources pursuant to a legal hold request and based in least in part on the hold and preservation rules;

confirming, via the first processor, successful preservation of the data with real time data integrity checks;

automatically identifying, via the first processor, data custodians and relevant data sources based on case information provided to a matter management module and define the scope of data collected by the data collection module, wherein the matter management module comprises the first processor and the first memory device, an enterprise legal hold module comprises the legal hold and preservation module and the data collection module, and enterprise legal management module comprises the matter management module and an enterprise dashboard;

providing, via a second processor and a second memory device, API integration with a plurality of eDiscovery applications, wherein an automated discovery workflow module comprises the second processor and the second memory device;

automatically including, via the second processor, all eDiscovery steps into a single template, wherein a legal template module comprises the second processor and the second memory device providing, via the second processor, automation when running a batch of evidence, wherein an automated workflow module comprises the second processor and the second memory device;

analyzing, via the second processor, eDiscovery requests and automatically determining an optimized process from a plurality of processes for collecting data responsive to eDiscovery requests, wherein determining the optimized process is based on historical data of similar cases; and providing, via a third processor and a third memory device, discovery as a service (DaaS) functionality and communicate with the enterprise system, wherein a bridge comprises the third processor and the third memory device.

8. The method of claim 7, wherein the data collection is performed by the enterprise system.

9. The method of claim 7, further comprising transferring data subject to eDiscovery from the enterprise system to a discovery system.

10. The method of claim 7, wherein the single template triggers the automated workflow module.

11. The method of claim 7, wherein the in-place locks preserves the data to a standard of a legal hold.

12. The method of claim 7, wherein the enterprise system is behind a firewall and the bridge is configured to pass the data between the enterprise system and the discovery system.

* * * * *